May 7, 1929.  S. M. FAIRCHILD  1,711,637
CONTROL SURFACE OPERATING MECHANISM
Filed Nov. 25, 1927
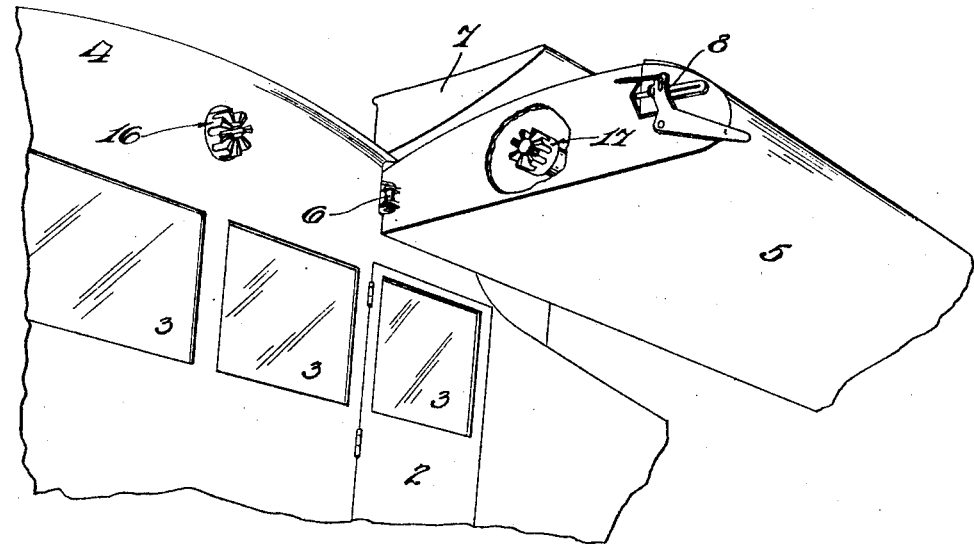
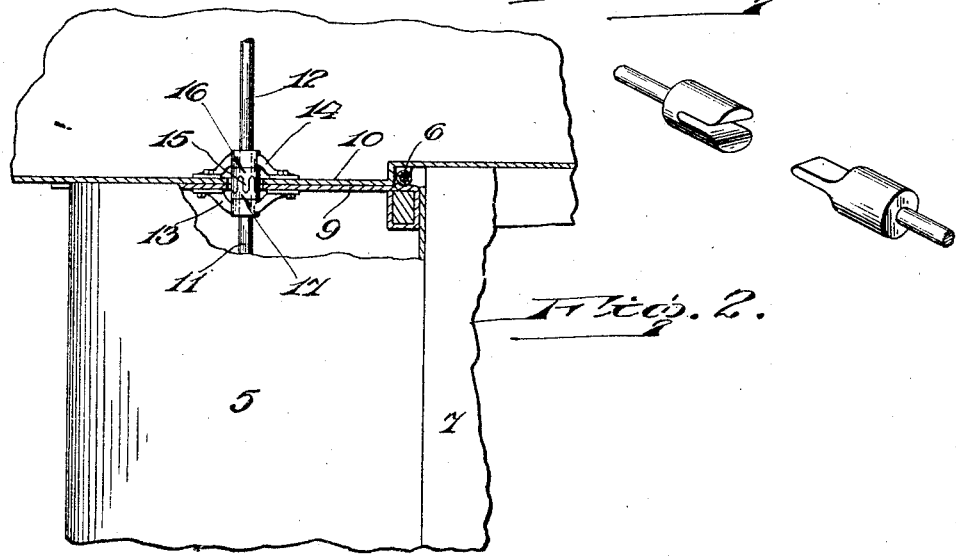
Inventor
SHERMAN M. FAIRCHILD
By his Attorney
B. H. Carpenter Patented May 7, 1929.

1,711,637

UNITED STATES PATENT OFFICE.

SHERMAN MILLS FAIRCHILD, OF NEW YORK, N. Y.

CONTROL-SURFACE OPERATING MECHANISM.

Application filed November 25, 1927. Serial No. 235,550.

This invention relates to folding wing airplanes and specifically to means for disconnecting the driving connections for the ailerons between the fuselage and the wing in folding the wing.

Heretofore in folding wing airplanes it has been prevalent to disconnect the control wires or operating mechanism for the ailerons thus destroying the adjustment in order to fold the wings and in no instance as far as I am aware has a separable mechanism automatically separated by the folding of the wings been employed for this purpose.

The object of this invention is to provide a simple means for disconnecting the drive of the aileron simultaneously with the folding of the wings without the necessity of removing, unlatching or loosening any of the aileron controls.

Another object of this invention is to provide a strong and rugged yet simple and positive releasable connection between the aileron operating mechanism contained within the body of the aircraft and that contained within the wings.

Other objects of this invention will become apparent from the following specification, claims and appended drawings in which:—

Fig. 1 is an elevational view of an airplane equipped with my device with the wings shown in folded position.

Fig. 2 is a fragmentary plan view showing the wing in normal or flying position, parts being broken away to more clearly disclose the invention.

Fig. 3 is a detail view of a modified form of clutch for the aileron control mechanism.

Referring to the drawings, in Fig. 1, I have indicated the body of the aircraft by the numeral 1. The body, as shown, is of the cabin type having windows 3, and a door 2 for the entrance of passengers. The upper part of the cabin comprises a central wing panel designated by the numeral 4.

A wing 5 is hinged to the panel 4 by a pin hinge 6. As shown in Fig. 1, the wing is of the type used on Fairchild monoplanes having a rearward folding portion 7 adapted to turn back upon the top of wing 5 when the same is folded to permit a more compact folding. The hinge 6 is adjacent the rear edge of the main wing section. A pin locking device 8 is provided near the front edge of the wing for securing the same in normal flying position and cooperates with a suitable fitting (not shown in the drawings) on the aircraft body.

As is clearly shown in Fig. 2, the end of the wing 5 adjacent the body 1 is formed with an end plate 9 which lies adjacent a similar plate 10 mounted upon the body when the wing is in normal flying position. The construction of these plates forms no part of the invention and therefore will not be described in detail.

As illustrated in the embodiment of the invention shown in the drawings the ailerons are controlled through a rod 11 within the wing 5. This rod is axially alined with a similar rod 12 in the body of the aircraft. The rod 11 is supported by a suitable bearing bracket 13 within the wing and attached to the end plate 9. The rod 12 is supported in axial alinement with the rod 11 from the plate 10 by a bearing bracket 14 as is clearly shown in Fig. 2. The rods 11 and 12 are coupled together by a separable dog clutch 15 composed of a dog member 16 attached to the rod 12 and a dog member 17 attached to the rod 11. It will be readily seen that in order to fold the wing it will be only necessary to release the front connection 8 and swing the wing rearwardly about its hinge 6. The members of the clutch 15 will thus be separated. To again bring the wing to flying position and the dog members 16 and 17 into registry, it is only necessary to swing the wing to its normal position and lock the same by the locking device 8. In this operation it will of course, be necessary to hold the ailerons in neutral position as well as the control mechanism within the aircraft body. Under these circumstances the clutch 15 will of course, make up in correct position. However, to facilitate the entrance of the dogs of the member 17 between the dogs of the member 16 the ends of the said dogs are chamfered, as shown in Figs. 1 and 2.

I do not wish to limit myself to the specific clutch shown, as I am well aware that a great many types of clutches will operate equally well and I have shown in Fig. 3 a modified form of clutch consisting of a cylindrical member 20 having a diametrically extending slot 21 formed in the end thereof. This slot is adapted to cooperate with an outwardly projecting similarly shaped lug 22 on a cylinder member 23. One member of this clutch is attached to the rod 12 and the other to the rod 11. The clutch members are so oriented that when the aileron control is in neutral position the slot 21 and lug 22 will lie parallel to the plane of folding movement of the wing. Any tendency of the clutch members to bind when separating during the folding of the wing is obviated by such an orientation.

I do not desire to limit my invention to control surfaces mounted on folding wings since the same is equally applicable to control surfaces mounted on a folding fuselage or empennage.

Various changes in the construction of the embodiment illustrated in the drawings may be made without departing from the spirit of the invention, and I do not therefore desire to limit myself to the specific construction shown and described but to interpret the invention broadly within the scope of the appended claims.

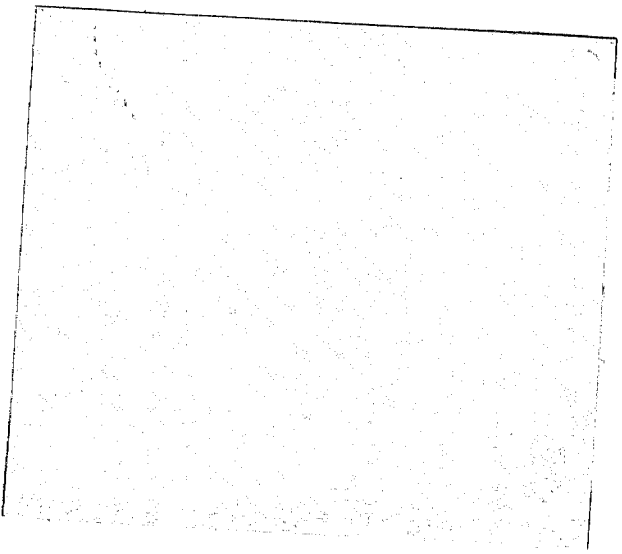

What I claim as my invention is:

1. In an aileron operating mechanism for an airplane having a folding wing, an aileron carried by said wing, operating mechanism for said aileron including a separable clutch separated by folding the wing.

2. In an aileron operating mechanism for an airplane having a folding wing, a control surface carried by said wing, operating mechanism for said control surface including a member carried by the wing and a member carried by the airplane and a separable clutch therebetween.

In testimony whereof I affix my signature.

SHERMAN MILLS FAIRCHILD.